United States Patent Office 3,228,250
Patented Jan. 11, 1966

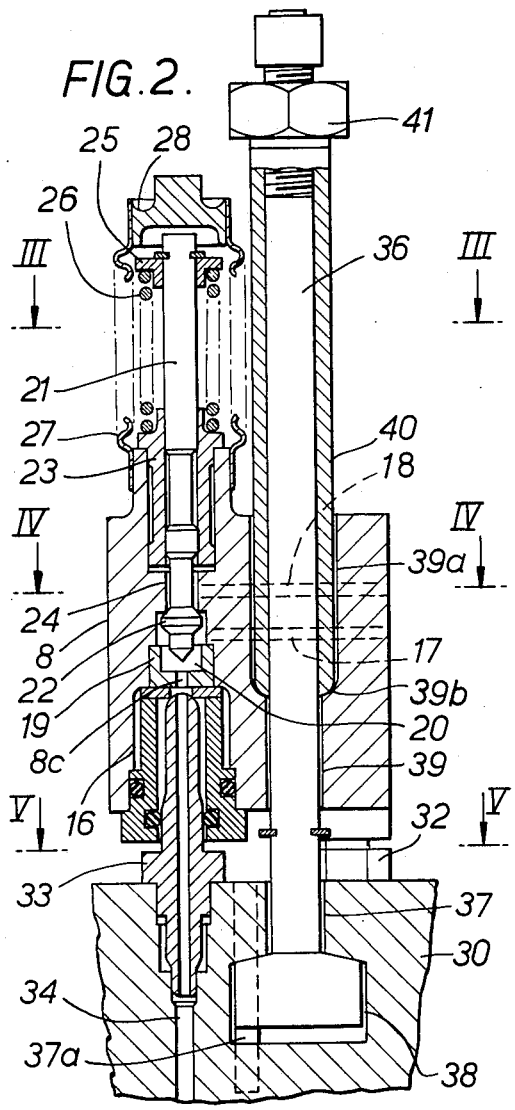

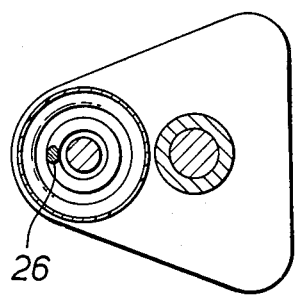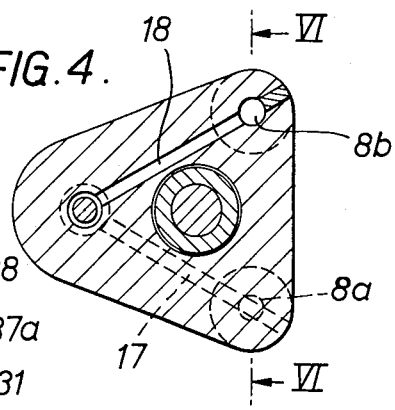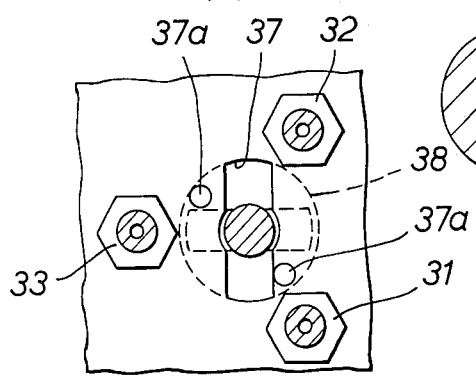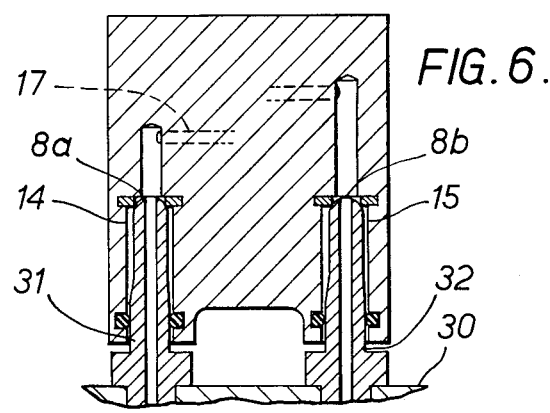

3,228,250
HIGH TEMPERATURE GAS COOLED
NUCLEAR REACTORS
Samuel Brittan Hosegood and Eric James Mitchell,
Weymouth, Dorset, and Cecil Harper, Preston, Weymouth, Dorset, England, assignors to United Kingdom
Atomic Energy Authority, London, England
Filed Nov. 30, 1961, Ser. No. 155,946
Claims priority, application Great Britain, Dec. 9, 1960,
42,571/60
5 Claims. (Cl. 73—421.5)

This invention relates to gas sampling apparatus and is chiefly concerned with selective sampling of a number of gas streams which are derived from gaseous coolant or fission product purge gas from nuclear reactors. In the former case coolant gas which is passed through a number of channels containing canned fuel in a nuclear reactor core is required to be sampled to determine whether fission products are penetrating the fuel canning whilst in the second a number of purge gas streams may be drawn through the core along passages in close proximity with the nuclear fuel in order to purge the core of fission products as they diffuse into the purge gas stream. In the purge gas system it is necessary to make provision for sampling the individual purge gas streams from time to time at some point in their flow paths between the core element itself and the fission product separation plant to obtain information concerning their fission product content.

According to the invention, gas sampling apparatus comprises a valved body having a number of inlet ducts for gas to be sampled and a corresponding number of valves arranged to communicate said ducts, in a first position of the valves with a source of flushing gas and in a second position of said valves with a sampling location, means tending to maintain the valves in the first position and means for moving any selected valve to its second position.

The direction of gas flow in the inlet ducts when the valves are in the first position is preferably opposite to the flow direction when the valves are in the second position so as to achieve a back flushing effect.

Each of the valves preferably has a port connected to a purge gas sampling line which can be made to communicate at will with one or other of two ports connected respectively to a source of clean gas and to a sampling location. As there are a substantial number of valves, it is convenient to connect either or both of the latter said two ports with a manifold.

Figure 1:
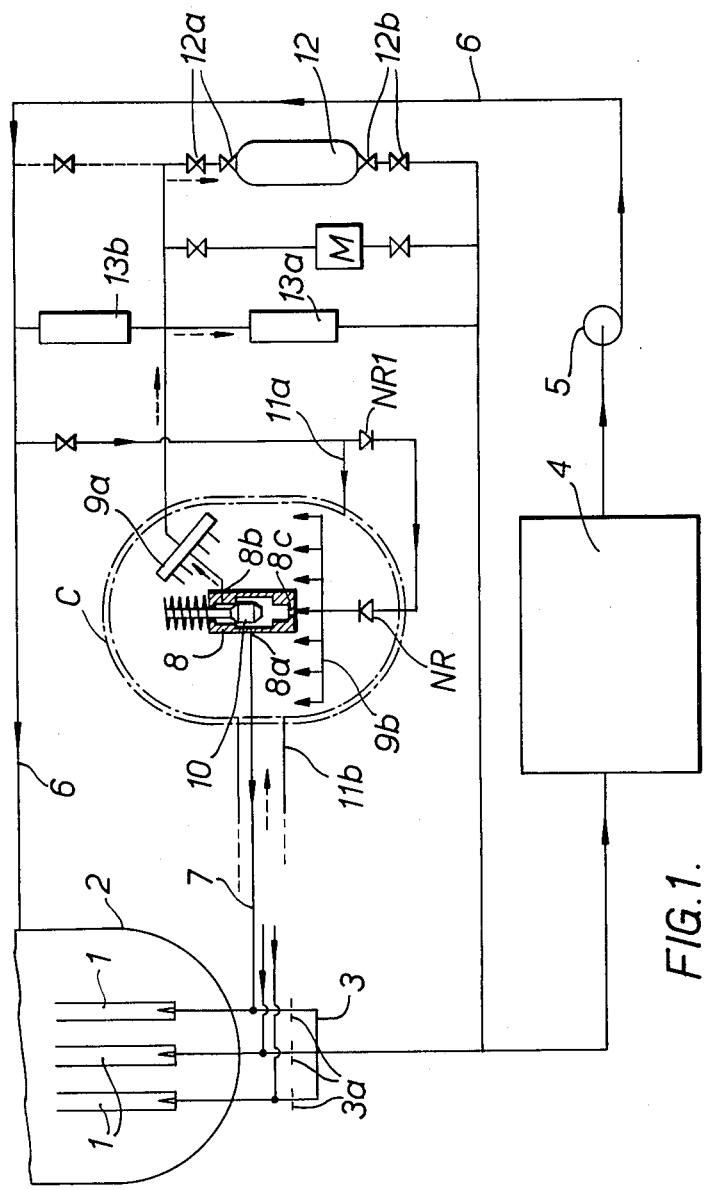
Figure 7:
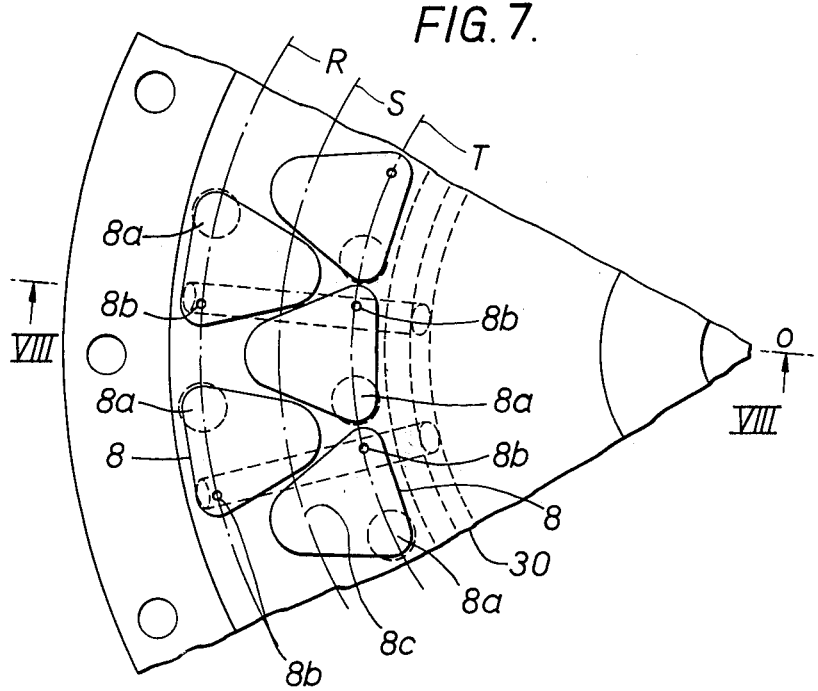
Figure 8:
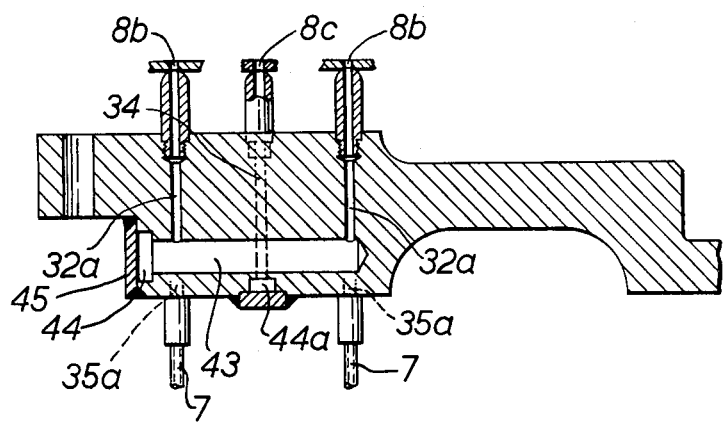
Figure 9:
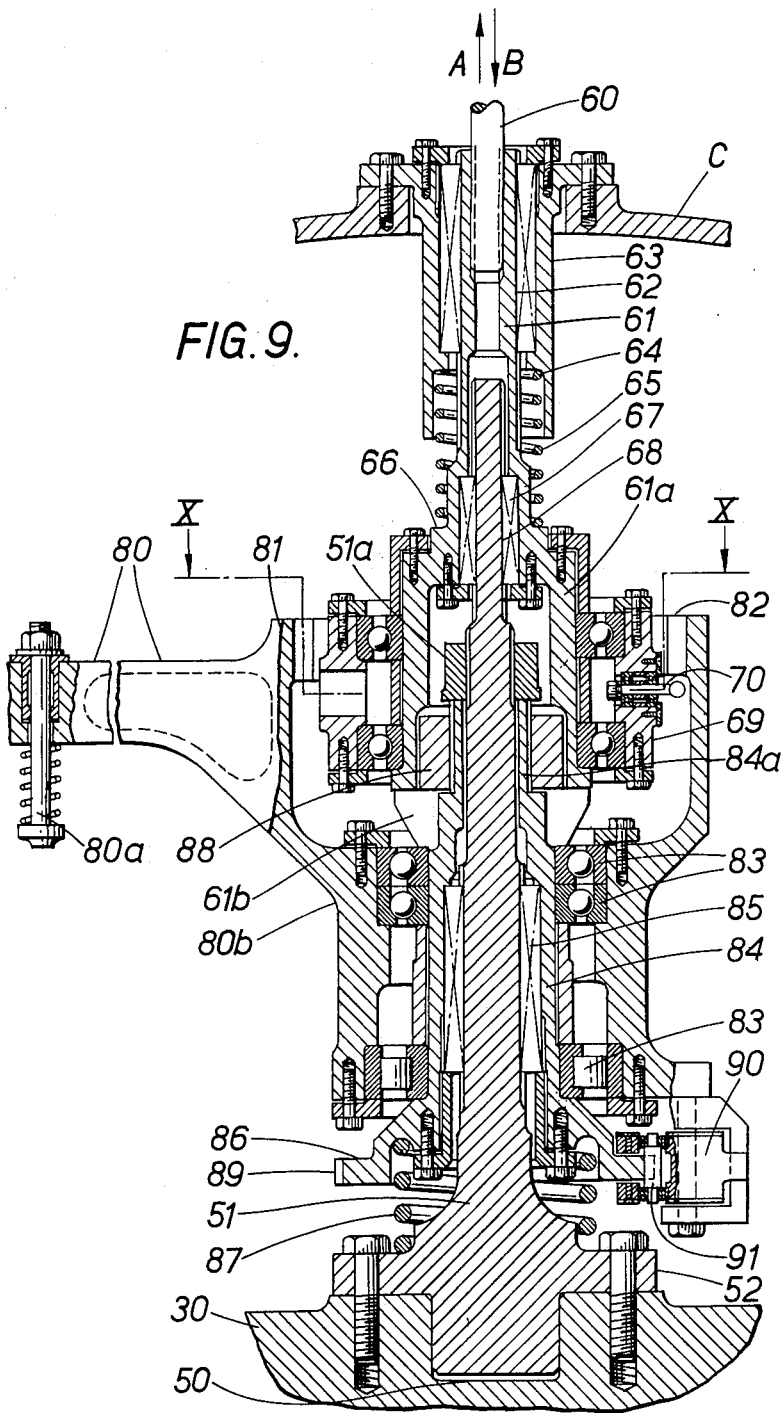
Figure 10:
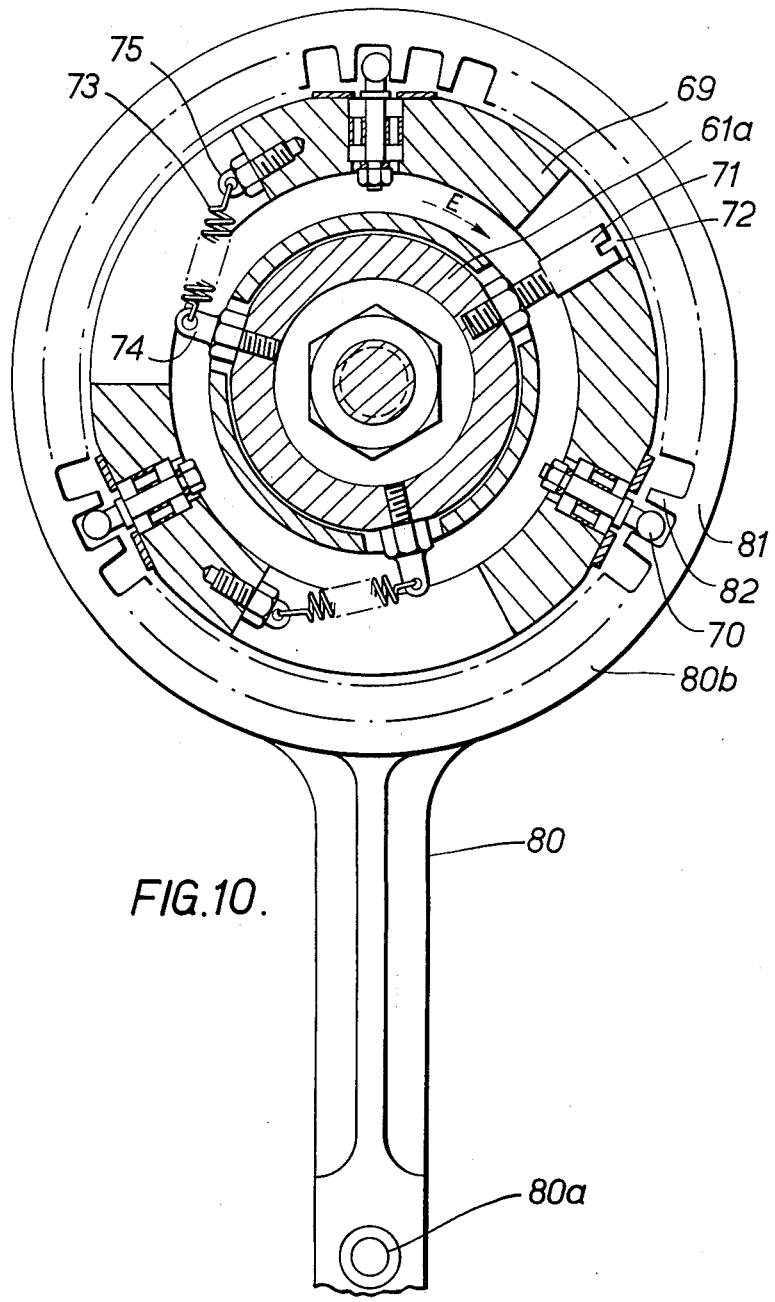
Figure 10A:
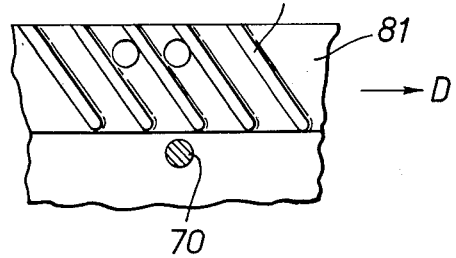
Figure 11:
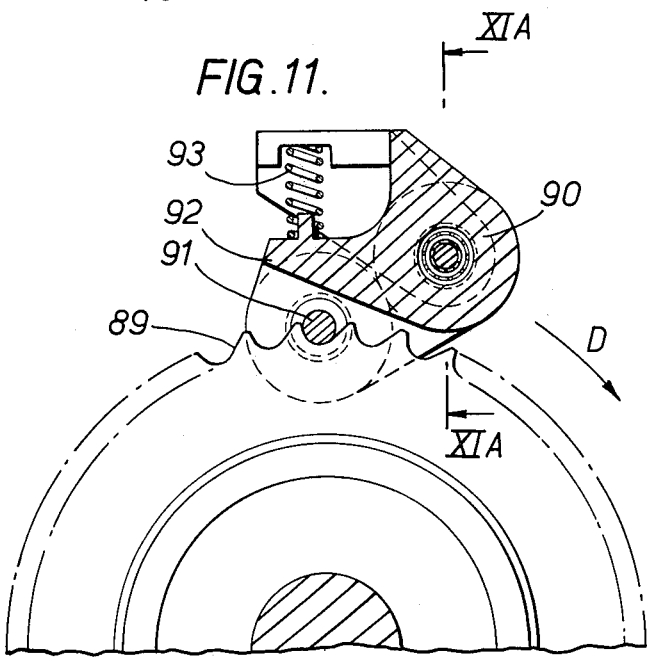
Figure 11A:
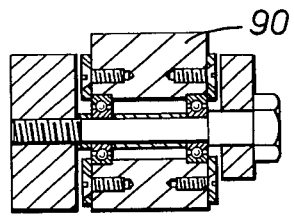

In order that the invention may be better understood one form of sampling apparatus embodying the invention will now be described with reference to the accompanying drawings in which;

FIG. 1 is a diagrammatic layout showing a preferred system of sampling a purge gas flow, FIG. 2 is a cross-section of one valve in its mounting, FIGS. 3, 4 and 5 are cross-sections taken on lines III—III, IV—IV and V—V of FIG. 2, FIG. 6 is a cross-sectional view on the line VI—VI of FIG. 4, FIG. 7 is a plan view of a part of the mounting member showing the disposition of the valves relative to the valve operating member, FIG. 8 is a cross-section taken on the line VIII—VIII of FIG. 7, FIG. 9 is a cross-sectional view through the valve operating mechanism, FIG. 10 is a section taken on the line X—X in FIG. 9, FIG. 10A is a scrap development view of part of FIG. 10, FIG. 11 is a section on the line XI—XI of FIG. 9, and FIG. 11A is a section on the line XIA—XIA of FIG. 11.

Referring firstly to FIG. 1, a purge flow of gaseous coolant is drawn through each of a plurality of nuclear fuel elements 1 supported in a nuclear reactor core within a pressure vessel 2. The purge gas flows which contain fission products evolved during reactor operation are passed through pressure restricting orifices 3a to a common manifold 3 whence the gas is drawn through a fission product delay and purification plant 4 by a fan 5. The latter delivers cleaned gas via line 6 back into the reactor pressure vessel as coolant gas.

In order to allow a sample of the purge gas to be taken from any one of the purge gas flows, capillaries are connected to the flow path of the purge gas upstream of the pressure restricting orfices 3a. Only one capillary 7 is shown but in practice there is one for each fuel element (or fuel element cluster) and these tubes which carry the radioactive purge gas sample are contained in a common pipe 11b carrying clean coolant gas as described below. The capillaries 7 enter a selector valve casing C in which a corresponding number of sampling valves 8, one for each capillary, are contained. Each of the valves 8 has three ports as shown diagrammatically in FIG. 1, a port 8a connected to the capillary 7, a port 8b connected to a sample gas manifold 9a and a port 8c connected to a flushing gas, i.e.clean gas, manifold 9b. Each valve 8 has a valve member 10 which if operated (i.e. depressed in this example) can put the capillary 7 carrying a sample flow of radioactive gas into communication with the gas sampling manifold 9a but is normally in its position shown to communicate the capillary 8 with a flushing flow of cleaned gas from manifold 9b.

The clean gas supply to manifold 9b, for this purpose, is drawn from the line 6 via pipe 11a. The valve assembly is enclosed by casing C pressurized from clean gas line 6 to contain valve leakage. The casing C is continuously flushed with clean gas passed into the casing via pipe 11a and expelled therefrom by pipe 11b. In the event of casing rupture with consequential loss of flushing gas pressure a back flow of purge gas along all thirty-seven (in this example) capillaries could contaminate the reactor coolant. To avoid this a non-return valve NR is incorporated on the upstream side of the manifold 9. In order to supplement the effectiveness of this valve a fail-safe type solenoid operated valve NR[1] is also included in the inlet line to the manifold 9b so that if the power supply fails NR[1] will close. The line between the valve NR[1] and valve NR is a double wall pipe.

A sample bottle 12 is connected between the outlets of manifold 9a and that of a purge gas manifold 3 in the reactor and has valves 12a, 12b arranged so that the bottle with a sample of purge gas can be removed bodily from the circuit. A radiation monitoring device M is connected between the manifold 9a and to the upstream side of the purification plant 4 for the purpose of monitoring radiation on occasion from any one of the fuel elements.

Pressure measuring devices 13a, 13b are connected respectively across the manifolds 3, 9a and across line 6 and manifold 9a, the device 13a giving an indication of the pressure drop across orifice 3a, device 13b giving similar indication of the pressure drop through the fuel elements.

Referring now to FIGS. 2–5, each of the valves 8 comprises a body generally triangular in plan and formed with three sockets 14, 15 and 16 (FIGS. 2 and 6) in its lower face at the corners of an equilateral triangle and at the head of each of the sockets, a port 8a, 8b and 8c is formed.

The port 8a which functions as a clean gas outlet or a sample gas inlet corresponds with port 8a in FIG. 1 and communicates with one end of a transverse bore 17 in the valve body. The port 8b which corresponds to port 8b in FIG. 1 communicates with one end of a transverse bore 18 in the valve body 8. Into the port 8c is fitted an apertured valve seating member 19, the aperture in which communicates with a valve chamber 20.

The interior of the valve chamber 20 communicates with the end of transverse bore 17 (FIG. 2).

The valve member comprises a stem 21 carrying a valve head 22 within the valve chamber 20 and movable endwise in a valve guide 23. Between the valve guide 23 and the valve chamber 20, the valve body is drilled oversize with a bore 24 to accommodate the valve stem 21, with clearance, thus allowing transverse bore 18 to communicate with the valve chamber 20 by way of the clearance in one position of the valve (referred to herein also as the second portion of the valve).

However, in the position shown in FIG. 2, which is the first, or inoperative, position of the valve, the port 8a communicates with port 8c through the valve chamber 20 and transverse bore 17 whilst the communcation between port 8b and the valve chamber 20 is prevented by engagement of a shoulder on the valve head with rim of the bore 24.

The valve stem 21 extends externally of the valve guide 23 and carries near its end an abutment pin 25 for a helical spring 26, the other end of which abuts an external flange on the valve guide 23, a flexible sealing bellows 27 enclosing the extended portion of the valve stem 21 to prevent leakage of gas. The upper end of the bellows is closed by a rigid metal end cap 28. To operate the valve, the valve stem 21 is moved endwise by the application of axial pressure on the end cap 28 causing the valve head 22 to be moved into contact with the valve seating member 19. In this position, communication between port 8c and the valve chamber is prevented whilst ports 8a and 8b are put into communication with one another via transverse bores, 17, 18 and the valve chamber 20.

Connections of the ports 8a, 8b and 8c with their corresponding channels in a mounting member 30 is achieved through three similar, drill spigots 31, 32 (FIG. 6) and 33 (FIG. 2) respectively. The spigots are screwed into tapped holes in the mounting member 30, each hole having a counterbore as at 34 extending coaxially of the bore in the spigot.

For mounting each valve on the mounting member 30, a single T-headed bolt 36 is employed. To receive the bolt head, a key-hole slot 37 and undercut recess 38 is formed in the mounting member 30 at a position coincident with the centre of area of the triangle formed by the three mounting spigots (FIG. 5). Dowels 37a serve to locate the head of the bolt 36 in the undercut recess 38.

A corresponding hole 39 is formed in the valve body at the centre of area of the triangle formed by the three sockets 14, 15 and 16 (FIG. 4). The upper part 39a of the hole 39 is of enlarged diameter to accommodate a seating sleeve 40 which has a rounded lower edge 39b abutting a curved end of the sleeve. The end of the sleeve 40 remote from its curved end is engaged by the fastening nut 41 for the bolt 36. As the nut 41 is screwed down on the bolt with the spigots 31, 32 and 33 engaging in the sockets 14, 15 and 16, a degree of rocking of the valve body is permitted on the fixing bolt to facilitate efficient sealing between the spigots and sockets.

FIGS. 7 and 8 show respectively in plan and cross-section a segment of an annular mounting member suitable for mounting a plurality of valves described with reference to FIGS. 2-6.

As indicated diagrammatically in FIG. 8 the valves 8 are mounted on the annular mounting member 30 in two annular rows such that the valve ports coincide with ports in the annular member positioned on three concentric circles R, S and T on the centre 0 of the annular member.

The controlled port, i.e. the port 8c of each valve is thus arranged to register with axial passages 34 drilled in the member 30 on the intermediate circle S and thus the valve operating rods lie on this circle. The position of each alternate valve is such that its other ports 8a, 8b lie alternately on the outer circle R and the inner circle T, the ports 8b registering with axial bores 32a (FIG. 8). The ports 8a on each valve coincide with axial passages (not shown fully but indicated at 33a) parallel with bores 32a and which extend through the member 30 to communicate with individual sampling capillaries 7 (see also FIG. 1). The capillaries 7 communicate with the purge gas flow in the reactor 2, the purge gas sampling may be obtained from the fuel element mounting spike such as is described in co-pending U.K. patent application No. 42,572/60.

Radial blind bores 43 are drilled in the mounting member such that each bore intercepts two of the axial bores 32a, one on the circle R and the other on the circle T. The open ends of bores 43 communicate with a peripheral groove 44 which is closed by a ring 45 to form a sample gas manifold 9a of FIG. 1. The axial bores 34 each communicate with an annular groove 44a in the underside of the annular member 30. The groove 44a forms the flushing gas manifold 9b of FIG. 1.

The connections to the two manifolds 9a, 9b is indicated in FIG. 1.

FIG. 9 shows a preferred means of mounting a rotatable selector arm centrally of the mounting member 30.

The mounting member 30, which it will be understood is disc shaped has with 37 valve locations for valves 8 and one for a non-return valve NR, around its marginal portion disposed as shown in FIG. 7 so that the valve operating end caps 28 lie on a common circle "S." A central well 50 member 30 which locates a pillar 51 secured to the member 30 by bolts passed through a flange 52. The mechanism in FIG. 9 is operable by a pull in the direction of arrow "A," applied to a rod 60 to rotate a rotary selector arm 80 step by step around the axis of the pillar 51. The arm 70 may be depressed to operate any one of the valves 8 by a push, applied in the direction of arrow "B," to the rod 60, the whole mechanism then sliding on the pillar 51 towards the annular member 30.

The operating rod 60 is screwed into a bore in one end of a tubular member 61 which is splined externally at 62 to a dependent tubular grommet 63 attached to the fixed valve casing "C." The grommet 63 extends within the casing "C" and has its free end formed with a skirt and a shoulder 64 to provide a fixed abutment for a helical spring 65. The other end of the spring 65 abuts against an external shoulder 66 on the tubular member 61 which member is at this region splined internally at 67. Splines 67 engage complementary splines 68 on the upper length of the pillar 51. A nut 51a is screwed onto the pillar 51 below splines 68. The tubular member 61 has a bellmouthed end portion 61a which encircles the central portion of the pillar 51 and carries externally, in bearings, a rotary sleeve 69 which has three radially outwardly extending pins 70 (FIGS. 9 and 10).

The rotary motion which the sleeve 69 can perform is limited by a stop 71 (FIG. 10) which is screwed to the bellmouthed portion 61a of the tubular member 61 and extends radially therefrom into an arcuate slot 72 in the sleeve 69. The latter can thus only rotate within the limits of the slot 72 and is normally held in the position shown in FIG. 10 by return springs 73 anchored between eye pins 74, 75 fixed on the tubular member 61 and a slotted portion of the sleeve 69 respectively.

The valve actuating arm 80 has a valve operating head 80a at its free end and is mounted on the pillar 51 for rotary movement about the pillar axis by its tubular mounting portion 80b. Internally the portion 80b is formed with an enlarged diameter portion 81 formed with internal helical teeth 82 positioned for engagement with the pins 70. FIG. 10a shows a developed view of the teeth 82.

The arm 80 is supported on bearings 83 carried by a tubular mounting member 84 which is splined internally at 85 to the pillar 51. The lower end of the member 84 has a flange 86, the end face of which is grooved to form an annular abutment for one end of a helical compression spring 87, the other of which abuts the adjacent face of flange 52 on the pillar 51.

The end portion 84a of the member 84 remote from the flange 86 is of reduced diameter and enters the mouth of the bellmouthed portion 61a of tubular member 61. A nut 88 is screwed on to the end portion 84a, in order to clamp a distance piece 61b against the upper bearing 83.

The nut 51a is screwed on to the part of the pillar 51 which extends within the bell shaped portion 61a, provides an end stop for the tubular mounting member 84.

The periphery of flange 86 has ratchet teeth 89. The teeth 89 engage with a non-return device 90 carried by an excrescence formed on the tubular mounting portion 80b. The device 90 shown in more detail in FIGS. 12 and 13 comprises a roller 91 mounted on a pivoted arm 92 which is urged by means of a spring 93 into engagement with teeth 89, the profile of which permits rotation of the arm 80 in the sense indicated by arrow "D" (FIG. 11) but prevents rotation in the opposite sense.

In operation, to rotate the valve operating arm 80, the rod 60 is pulled, e.g. by a suitable electro-magnetic device, in the direction of arrow "A" so as to lift the tubular member 61 on the pillar splines 68 so compressing spring 65. The part 61a of the member 61 which carries the rotary sleeve 69 similarly is raised and the pins 70 enters between helical teeth 82 so causing the arm 80 to rotate in direction of arrow "D" (FIG. 11), the sleeve 69 being prevented from rotating (in the opposite sense) by the stop 71 engaging the slot 72 in the sleeve.

The rotation of the arm 80 causes the non-return device to move over one tooth of the flange 86 which thereafter holds the arm 80 in its rotated position. When the rod 60 is released the return springs 73 move the tubular member 61 to its former position and the pins 70 move downwards out of engagement with the teeth 82. As this happens the sleeve 69 is made to rotate in the direction of the dotted arrow "E" (FIG. 10) against the bias of springs 73. Once the pins 70 are disengaged from the teeth 82 then the springs 73 take charge and pull the sleeve 69, rotationally back to the position shown in FIG. 10 against the end of the slot 72. The mechanism is then in its original position whereat the arm 80 is ready for a further increment of rotation by operation of the rod 60.

The valve operating arm 80 is actuated by being moved downwards on the pillar 51 against the spring 87 so that the operating head 80a can operate any one of the selected valves. The actuation is effected by the application of a push on the rod 60 in the direction of arrow "B" which causes the tubular member 61, 61a and its associated parts to move downwardly on the pillar 51. As the lower end of member 61a engages on the distance piece 61b the tubular member 84 is forced downwards on splines 85 against the spring 87, the thrust being transmitted through bearings 83, carrying the operating arm 80 downwards. When the pressure on the operating rod 60 is released then the return spring 87 raises the arm 80 until the upward movement of the tubular member 84 is arrested by its upper end coming into contact with the nut 51a.

Thus by manipulation of the rod 60 any one of the 37 valves 8 can be operated. The mounting member 30 does in fact contain 38 positions. The 38th position is occupied by the non-return valve NR (FIG. 1) such that in the event of a fractured valve casing "C," the arm 80 may be rotated to a position to operate valve NR which will reinforce the pressure fluid operation of valve NR by mechanical pressure from the arm 80 and prevent back flow of radioactive gas from the sampling manifold 9 into the casing "C."

As mentioned above, if, due to electrical power failure, the reinforcement by operation of arm 80 cannot be utilised then the solenoid valve $NR^1$, responsive to cut-off power, will automatically close.

The valve operating mechanism described above is particularly suited for handling helium as a coolant gas as it is compatible with the restrictions in friction and lubrication normally associated with helium atmospheres.

We claim:

1. Sampling apparatus for gases comprising a mounting structure having passages therein; a plurality of valve bodies having channels therein; means for mounting said bodies on said structure in an annular row such that the channels in the bodies communicate with the passage in the structure, each valve body having a chamber; first, second and third ports connecting the chamber respectively by way of said channels and said passages with supply of gas to be sampled, a sampling facility and a supply of flushing gas; valve members movable between a first position communicating the first port with said second port and a second position in which said first port is communicated with said third port; means urging each valve member to the second position; and means for moving any selected one of the valve members to said first position, said actuating means comprising an arm mounted for rotation about the center of the annular row and adapted to co-operate with the valve members to actuate a selected valve, said structure containing bores extending radially therein with respect to said annular row and intersecting an annular manifold.

2. Apparatus as claimed in claim 1 in which an outer casing encloses the valves and the mounting member and means are provided for connecting the interior of the casing with the source of flushing gas.

3. Apparatus as claimed in claim 1 including a pressure responsive non-return valve is provided for preventing back flow of gas through the valves into the manfiold connected to the source of flushing gas.

4. Apparatus as claimed in claim 2 in which said non-return valve is mounted on said mounting member for positive mechanical operation by the valve operating member.

5. Sampling apparatus as claimed in claim 1 in which each valve has three ports communicating with three channels in the body, the ports being arranged in coplanar relationship at the corners of an equilateral triangle and a single fastening device mounted at the center of area of the triangle and attaching the valve to the body with the ports coincident with said channels.

References Cited by the Examiner

UNITED STATES PATENTS

| | | | |
|---|---|---|---|
| 2,595,311 | 5/1952 | Strange et al. | |
| 2,721,578 | 10/1958 | Pouppirt | 137—637 |
| 2,859,335 | 7/1959 | Kraftson et al. | 73—421.5 |
| 3,028,327 | 4/1962 | Weeks | 204—193.2 |
| 3,043,145 | 7/1962 | Hoffman | 73—421.5 |
| 3,063,926 | 11/1962 | Poole et al. | 204—193.2 |

LOUIS R. PRINCE, *Primary Examiner.*

REUBEN EPSTEIN, RICHARD C. QUEISSER, M. R. DINNIN, S. C. SWISHER, *Assistant Examiners.*